Oct. 2, 1956
I. T. THORNSON
2,764,812
INSIDE TUBE CUTTER, PARTICULARLY FOR HEAT EXCHANGERS
AND THE LIKE HAVING TUBES OF SMALL DIAMETER
Filed June 28, 1954
2 Sheets-Sheet 2
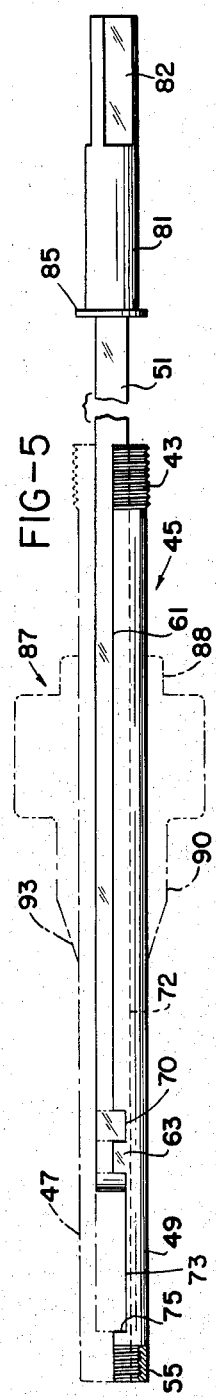
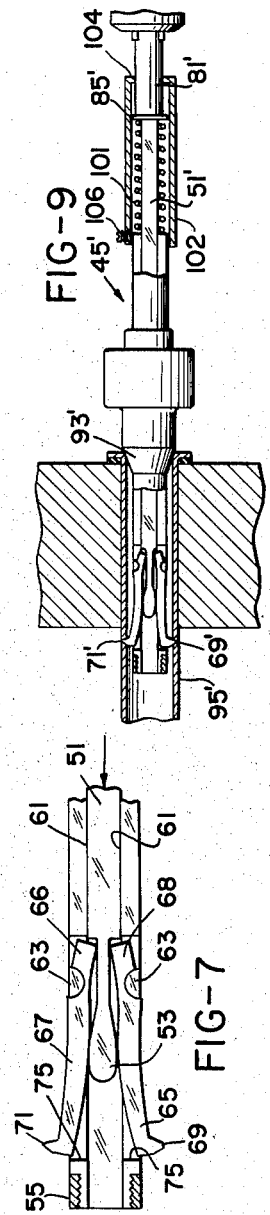
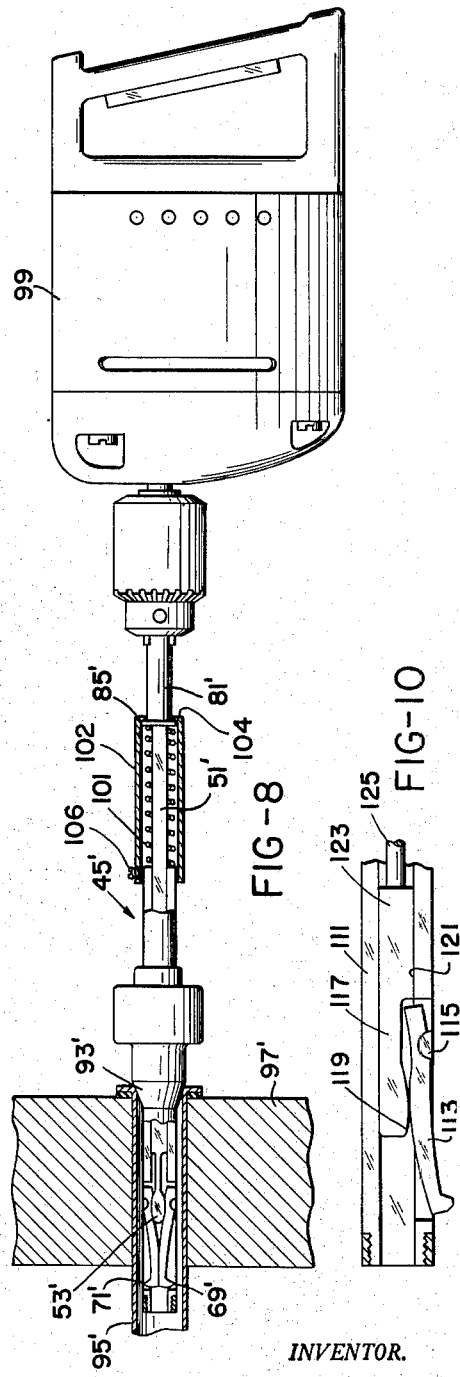
INVENTOR.
INGOLVER T. THORNSON
BY Toulmin & Toulmin
ATTORNEYS

United States Patent Office 2,764,812
Patented Oct. 2, 1956

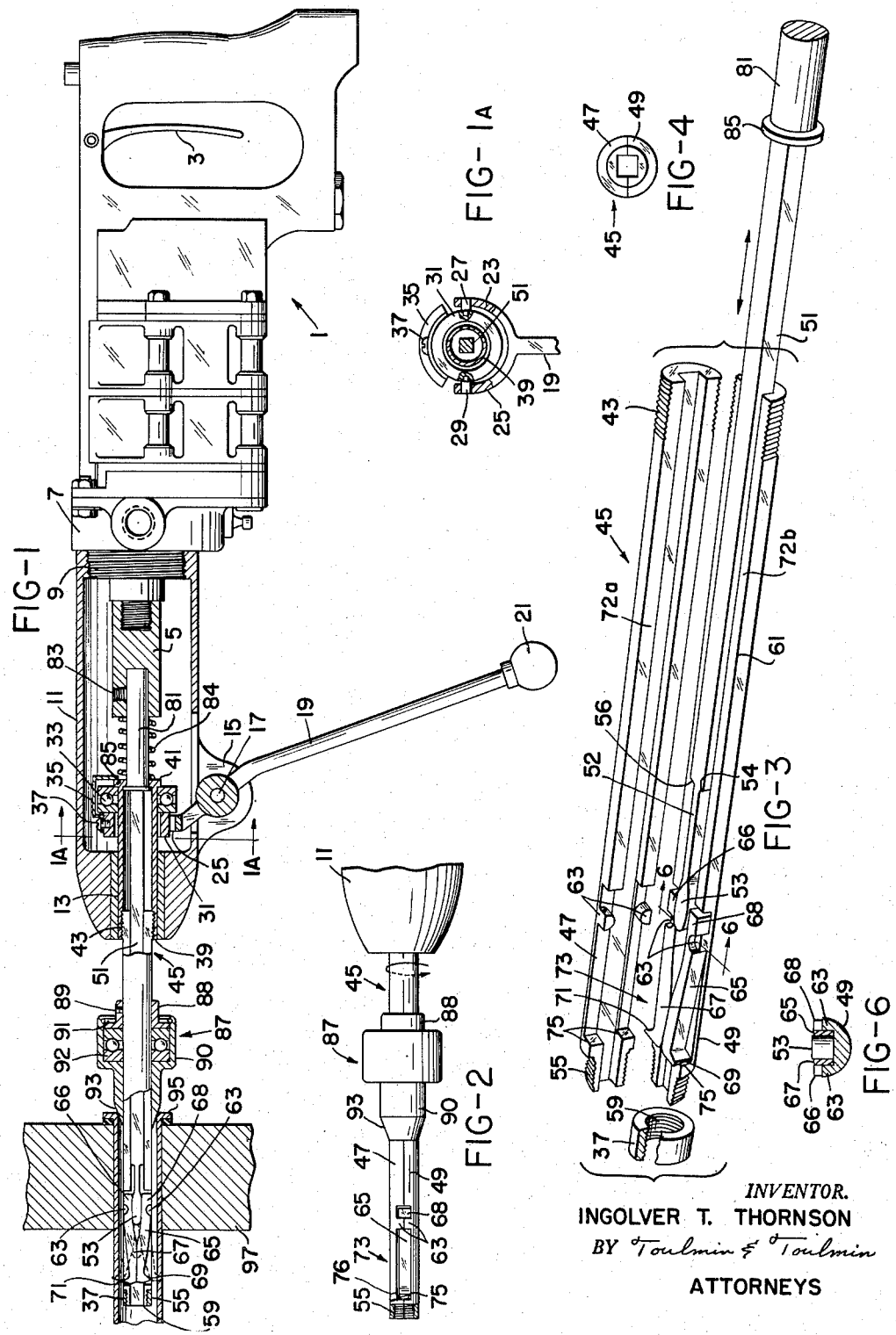

2,764,812

INSIDE TUBE CUTTER, PARTICULARLY FOR HEAT EXCHANGERS AND THE LIKE HAVING TUBES OF SMALL DIAMETER

Ingolver T. Thornson, Springfield, Ohio, assignor to The Airetool Manufacturing Company, Springfield, Ohio, a corporation of Ohio Application June 28, 1954, Serial No. 439,835

5 Claims. (Cl. 30—106)

This invention relates to a tube cutting device and more particularly to a device for cutting small diameter tubes of less than about two inches.

It is accordingly a primary object of this invention to provide a novel tube cutter which is extremely effective for the cutting of small diameter tubes as the construction and arrangement of parts provide a high degree of rigidity under operating conditions.

Another object of this invention is the production of a tube cutter having few operating parts and constructed and arranged in a simple and efficient manner.

It is a further object of this invention to provide a tube cutter which is substantially not subject to jamming during the operation of cutting.

It is a particular object of this invention to provide a novel cutting device for tubes which device is economical to manufacture.

Yet another object of the invention is to provide a tube cutter in which the cutting heads are rigidly supported during the cutting operation.

A primary object of the invention is to provide a tube cutter in which means are provided for positively expanding and retracting the cutting heads of the device.

Yet another object of the invention is to provide a tube cutting device in which any slight amount of fines received into the device during a cutting operation are automatically forced outwardly of the device by the operation thereof.

A principal object of the invention is to provide a cutting device which is automatically centered.

The invention will be more fully understood by reference to the following detailed description and accompanying drawings wherein:

Figure 1 is a view partially in section of the tube cutting device of invention mounted in a tube sheet and provided with power means for operatively driving the tube cutting device;

Figure 1A is a sectional view taken on line 1a—1a of Figure 1;

Figure 2 is a fragmentary view of the tube cutting device of Figure 1, the view being taken at a 90° angle from that of Figure 1;

Figure 3 is an exploded view of the tube cutting device of the invention including the mandrel drive shaft of the device and the housing therefor;

Figure 4 is an end wiew indicating the mode of assembling the housing of the device of invention;

Figure 5 is a front elevational view of the structure of invention with a portion of the equipment shown in phantom;

Figure 6 is a sectional view taken on line 6—6 of Figure 3;

Figure 7 is a fragmentary view in plan indicating the cutting heads of the tube cutting device in cutting position;

Figure 8 is a view of the tube cutting device of invention shown in cooperative relation with an electric drill type motor;

Figure 9 is a view similar to that of Figure 8 with the cutting heads of the tube cutting device in cutting position; and Figure 10 is a view similar to that of Figure 7 of a further embodiment of the invention.

Referring to the drawings and initially particularly to Figure 1, there is indicated at 1 a pneumatic motor having a usual trigger switch 3 and a rotatable chuck 5 mounted thereon. Secured to the casing 7 of the motor by screw threads at 9 is a substantially tubular support 11 narrowed down forwardly at the nose thereof and provided at 13 with an interior bearing surface. The support 11 at the lower portion thereof has depending parallel ears 15 through which a transverse pin 17 extends and a handle 19 is pivotally supported upon the pin 17.

The lower portion of handle 19 is provided wtih a grip 21 and the upper portion thereof terminates in a yoke-shaped member (Figure 1A) having arms 23, 25 through which pins 27, 29, respectively, extend (Figure 1A) into a longitudinally movable collar 31. Collar 31 is prevented from rotation by the pins and is further secured to the bearing 33 by an arcuate cover 35 (Figure 1A) for the bearing, the cover being retained on the collar by a suitable screw 37. This cover extends over the bearing races and a depending portion thereof is engageable with a flange 41 as noted more particularly hereinafter.

Slidably mounted within the nose of the tubular support 11 in contact with the bearing surface 13 is a sleeve 39 which at its right hand end has integral therewith flange 41, which flange is positioned between a race of the bearing 33 and the depending portion of the bearing cover 35. Secured to the sleeve 39 leftwardly by screw threads 43 is the housing 45 of the device of invention.

Referring now particularly to Figures 1–7, inclusive, the housing 45 is preferably comprised of two identical semi-cylindrical metal members 47, 49 each of which is grooved or slotted longitudinally of the housing as at 72a and 72b (Figure 3), the groove extending substantially axially and receiving a suitable steel driving mandrel 51. The mandrel is reciprocably slidable and non-rotatably mounted in the housing and carries integral therewith a camming head portion 53 which extends from a narrowed down throat portion 52 of the mandrel. Most suitably the mandrel has a substantially square cross section (Figure 1A), and the throat and main portion of the body of the mandrel are connected by a shoulder 54 which is relieved slightly as at 56. The mandrel 51 over its entire length including the camming head portion 53 and the throat portion 52 is in sliding contact with the housing as most clearly shown in Figure 5.

Leftwardly as indicated in Figure 3 the semi-cylindrical longitudinally extending housing members 47, 49 are threaded exteriorly as at 55 and these threaded portions, in the assembled condition of the device, are provided with an interiorly threaded cap 37 which retains the portions together. The cap is itself provided, as most clearly seen in Figure 1, with an end aperture 59 which communicates with the groove or slot 72 (Fig. 5) formed longitudinally in the housing; the groove 72 is itself formed by the combination of grooves 72a and 72b as shown in Fig. 3.

The formation of rectangular or substantially square grooves in the housing provides opposed ridges as at 61 in Figures 3 and 5, which ridges extend over a major portion of the housing length; integral with the housing member 47 and spaced from the ridges at the left hand end (as shown in Figures 3 and 5) are pivot members 63 which are substantially semi-cylindrical and have their cylindrical portions facing on the grooved central area of the housing.

Cutters 65, 67 in the form of tool bits engage at their rearward portions 68, 66, respectively, about the pivot members 63 and are forwardly provided with cutting heads 69, 71, respectively, the tool bits suitably being composed of high speed tool steel.

The tool bits extend substantially longitudinally with the housing 45 (Figure 2) and the backs or interior surfaces of these tool bits are arcuate or cam shaped to receive therebetween in camming relation the camming head portion 53 of the mandrel 51.

Cutters 65, 67 are positioned on either side of the camming head portion 53 and confine the same to a limited degree of longitudinal movement in the housing, the throat portion 52 being movable between the rearward ends of the tool bits in reciprocal sliding movement of the mandrel.

Each of the semi-cylindrical members 47, 49 is cut out to provide narrow longitudinally extending lands 70 on either side of the pivot members and the tool bits are mounted thereon about the pivot members for sliding substantially radial movement outwardly of the housing, as is most clearly seen in Figure 7.

Also as seen in Figure 7 the tool bits in the extended position of the cutting heads extend longitudinally of the housing through slot means indicated generally at 73, and in this extended position the tool bits are substantially coincident with the periphery of the housing.

The cutting heads are extended when the head portion of the mandrel is moved forwardly as shown in Figure 7 to urge the tool bits outwardly about the pivot members and as shown in Figure 7 the rearward portions of the tool bits in this extended position engage the throat portion 52 of the mandrel, and accordingly the tool bits are held rigidly positioned for cutting.

In the rearward position of the camming head portion 53 of the mandrel the same engages the relatively sharply inwardly curved arcuate surfaces of the tool bits and is effective in this position to cause pivotal retraction of the tool bits about pivot members 63 to the Figure 3 position, where the tool bits are held rigidly inwardly of the housing.

Referring now to Figure 3 particularly it will be noted that the cutting heads 69, 71 are very closely positioned adjacent the inner end 75 of the housing with only a minimum amount of clearance. When in the retracted position as shown in Figure 1 the cutters are in secure back to back relation and they substantially close the end aperture 59, only a slight clearance existing between the housing groove and cutter bottoms (Figure 3).

When the camming head portion 53 of the mandrel is in the expanded position shown in Figure 7 the combination of the tool bits and the camming head portion 53 blocks the end aperture 59 completely, and should any fines from the cutting operation enter the small clearance at 75 the rotation of the device and the contact of the fines with the combination of cutter heads and the camming head will cause much of these fines to be thrown outwardly through the aperture 59. The exclusion of fines is further facilitated by relieving the housing as at 76 adjacent the cutting heads on the side thereof which is forward in the rotation of the device as indicated in Figure 2 by the arrow.

The mandrel 51 at its right hand portion is integral with the shank 81 which passes through the sleeve 39 (Figure 1) and is secured in the rotatable chuck 5 by a set screw bearing on a flat as at 82. The shank has integral therewith an enlarged collar portion 85 which engages the flange 41 interiorly of the sleeve 39.

The housing 45 carries between the ends thereof a stop member 87 which is constituted of a first portion 88 fixed to the housing by a set screw 89 and a second portion 90 retained on the first portion by a retaining ring 91.

The portion 90 includes a bearing 92 and a forward conically shaped guide surface 93. Accordingly in operation the portion 88 rotates with the housing 45 while the portion 90 including its guide surface 93 remains stationary.

In the operation of the structure shown in Figure 1 the apparatus is inserted into one end of the tube 95 (the other end of which is not shown), the tube itself being secured in the seat of the tube sheet 97 and the guide surface 93 being securely engaged within and against the outer end of the tube. This engagement is effected by simply having the operator of the motor urge the structure against the tube sheet as shown.

Movement of the handle 19 leftwardly (Figure 1) tends to cause sleeve 39 and accordingly housing 45 to be drawn rightwardly (Figure 1), and the camming head portion 53 and the housing 45 to move relatively such that the camming head urges the cutting heads 69, 71 outwardly of the housing. The tendency of the housing itself and for the guide surfaces 93 to move rightwardly (Figure 1) is compensated by the operator who urges the tool into constant engagement with the tube. Thus the net effect is that the camming head portion 53 of the mandrel 51 moves more deeply into the tube to expand the cutter heads substantially radially outwardly of the housing. The tool bits are relieved toward the cutting head (Figure 3) and so formed that they fill out the cut-out portions or slot means 73 smoothly and substantially form a part of the cylindrical housing, there being no protuberant portions other than the cutter heads.

Operation of the motor drives the housing through the square mandrel 51 and the tool bits are rigidly backed by the camming head portion 53 and rearward portions of the tool bits as the cutter heads cut through the tube (Figure 1). Upon completion of the cut, movement of the handle 19 rightwardly (Figure 1) causes the camming head portion 53 to retract rightwardly relatively to the housing, and the camming head portion 53 of the mandrel when it engages the rear cam surfaces of the tool bits causes a positive retraction of the cutting heads within the housing, permitting the device to be readily withdrawn from the tube end.

It is to be particularly noted that there is substantially no possibility for cut fines to enter the housing to jam this retraction mechanism, which jamming is a common cause of failure in other devices adapted for the general purposes.

It is to be noted further than the expansion and retraction of the cutting heads may be effected without resort to spring means. A spring 84, however, which urges the sleeve 39 and housing 45 forwardly, may be utilized as shown in Figure 1 either around the shank 81, or around the square rod 51 between the housing 45 and the collar 85, in order to retain the cutting heads in retracted position while the device is being moved from the operation of cutting one tube to the operation of cutting the next tube.

The cutting device illustrated in Figures 8 and 9 is similar to that of the previous figures modified to accommodate it to use with an ordinary electric drill. Accordingly similar numerals but primed are used for like parts in Figures 8 and 9.

The structure shown in Figure 8 comprises an ordinary electric drill motor 99 secured by a chuck to the shank 81' of the cutting device which, as shown, is positioned in a tube sheet with the conical surface 93' engaging the end of a tube.

As shown at the cutaway portion a spring 101 engages between the radially flanged portion 85' and the housing 45' and is compressed upon forward movement of the shank 81' with the motor. This forward movement causes the square mandrel 51' to move slidably forwardly with respect to the conical surface 93' and the cutting heads 69', 71' and to urge the cutting heads to cutting position. Operation of the motor then revolves the mandrel 51' and the housing 45' and causes the cutting heads to cut the tube 95' in the manner previously described.

The spring 101 in this latter embodiment (Figures 8 and 9) is suitably surrounded by a cylindrical shell 102 in spaced relation therewith and having an inwardly extending apertured flange 104 engageable over flange 85' and secured to housing 45' for rotation therewith by set screw 106; this shell aids in retaining the spring 101 positioned and maintains the spring free of grime.

Thus the primary distinction between the arrangement of Figures 8 and 9 and that of Figure 1 is that no spring action is required with the arrangement of Figure 1 though such may be employed if desired and when so employed the retention of the tool bits and their heads within the housing between tube cuts is facilitated. Such is desirable where a large number of tubes are to be cut out. The spring 101 of Figures 8 and 9 accomplishes this and in addition causes retraction of the mandrel 51' and hence of the camming head portion 53' against the inwardly curved rear surfaces of tool bits 65', 67'.

In the withdrawal of the cutting tool, after the cutting operation has been completed, the spring 101 which has been compressed during the cutting operation is permitted by the operator to urge the mandrel 51' and the head portion thereof rightwardly which causes the camming head portion 53' to engage against the rearward portion of the tool bits and to cam the heads inwardly. With the heads withdrawn within the housing the device as a whole may be readily withdrawn from the tube sheet as described in the prior embodiment.

It is thus to be noted that this invention provides for a number of features primary among which is a rigid support of the tool bits during operation, freedom from jamming, positive expansion and retraction, accurate centering of the device by the conical surface 93 and the cutting heads themselves.

The centering of the cutting device, which as already noted is effected by the combination of the cutter heads themselves and the conical surface aids materially in providing a clean cut which permits facile removal of the cut tube from the seat.

In this latter connection however it is to be noted that the device is adapted for use with one, two or a plurality of cutting heads. The utilization of one cutting head however provides difficulties of balance in operation and centering is not as suitable with two cutting heads. For large diameter tubes three or four tool bits may be employed but I have found that for small diameter tubes of 1½ inches to below ½ inch the employment of two tool bits with ferrous and non-ferrous metal tubes is entirely satisfactory and an extremely simple mechanical arrangement of low cost construction; in fact several hundred steel tubes in the above indicated range have been cut successfully in field tests without other wear than that normally expected on the tool bit itself.

With respect to the cost factor of the device it is important to note that only relatively simple machine operations are involved due to the feature of the split housing arrangement. When the cylindrical housing is divided longitudinally formation of the grooves, pivot members 63, the cut-out portions 73 and the end aperture 59, for example, become routine operations. Similarly the formation of the mandrel and head thereof as well as the camming surfaces of the tool bits are simple mechanical operations.

With respect to the operational features the rigid support of the tool bits by the camming head, and the three point centering afforded by the tool bits and conical surface (93) are extremely beneficial to the results attained in the cutting of both ferrous and non-ferrous tubes. The operation is further facilitated by the absence in the vicinity of the tool bits of any mechanism, such as springs, which could be jammed by the entry of fine cuttings into the housing.

Speed of operation is attained by the slidable feature of the camming mandrel, which mandrel is notable for the variety of functions which it performs and among which are camming of the tool bits, transmitting of power to the housing, and closing of the open end portion of the device to assist in ejection of fines.

These features also apply in general to a cutter having a single tool bit, which embodiment is illustrated in Figure 10, wherein the housing 111 mounts tool bit 113 pivotally at 115 and the mandrel 117 is provided with a camming head portion 119 for engagement with the tool bit. The mandrel slides in a groove 121 and is provided with a non-rotatable portion 123, preferably square cut, which extends from the cylindrical portion 125.

It will be understood that this invention is susceptible to modification in order to adapt it to different usages and conditions and accordingly, it is desired to comprehend such modifications within this invention as may fall within the scope of the appended claims.

I claim:

1. In a tube cutter device which is adapted to be supported manually by an operator of the device, in combination, a longitudinally extending cylindrical housing, a pair of pivoted oppositely disposed tool bits extending longitudinally in the housing and outwardly movable from the housing in opposed relation, a camming head in the housing confined for movement longitudinally between the tool bits by the housing and tool bits and engageable with the tool bits forwardly for rigidly urging the tool bits outwardly and engageable with the tool bits rearwardly for urging forward ends of the tool bits inwardly of the housing in back to back contact, a mandrel slidable and non-rotatable in the housing and having an extension rearwardly from the housing which extension is adapted to be driven for driving the housing, said mandrel terminating forwardly within the housing in said camming head for moving the camming head longitudinally between the tool bits, and a narrow throat portion of the mandrel between the camming head and the said extension of the mandrel, said throat portion being in sliding contact with the interior of the housing.

2. In a tube cutting device the structure comprising a longitudinally extending cylindrical housing split into substantially semi-cylindrical longitudinal portions, the portions having longitudinally extending cooperating ridges defining a longitudinal groove, a mandrel slidable in the groove, pivot members integral with the housing portions in opposed relation at a forward end of and spaced from the ridges and cooperable to close the housing, cutout portions of the housing defining lands extending to either side of each of the pivot members and bounding extensions of the groove, tool bits pivotally supported about the pivot members and mounted on the lands, the tool bits having their forward surfaces adjacent the housing periphery, the rearward surfaces thereof being arcuate and bounding the groove extension, and a camming head in the groove extension integral with the mandrel, slidable therewith and confined between the arcuate surfaces of the tool bits for limited longitudinal movement for engaging the tool bits forwardly and rearwardly in sliding movements of the mandrel.

3. The combination, in a tube cutting device of a cylindrical longitudinally extending housing, a mandrel slidable longitudinally and non-rotatable in the housing and adapted to be driven for rotating the housing, the housing having longitudinally extending opposed tool bits therein pivotal outwardly thereof, the mandrel having a head portion confined between the tool bits for limited movement longitudinally in the housing with relation to the bits, the tool bits, mandrel and head portion cooperating in the outward position of the tool bits to securely support the tool bits, and a conical surface member carried by the housing coaxial therewith surrounding the same and non-rotatable with the housing and engageable in a tube to be cut, the conical member and tool bits defining with the housing and mandrel a centering arrangement for the tube cutting device in the expanded position of the tool bits.

4. In a tube cutter device which is adapted to be supported manually by an operator of the device, a longitudinally extending cylindrical housing having an axial groove of rectilinear cross-section, a pair of pivoted, oppositely disposed longitudinally extending tool bits bordering the groove on opposite sides thereof and outwardly moveable from the housing in opposed relation, said tool bits having arcuate rearward surfaces, a mandrel having a cross-section corresponding to the rectilinear cross-section of the groove and mounted slidably within the housing for longitudinal movement in the groove, said mandrel having an extension rearwardly from the housing which extension is adapted to be driven for rotating the housing, the mandrel having integral therewith within the housing a narrow throat portion and a camming head portion extending forwardly in the housing of the throat portion, the camming head portion being confined for longitudinal movement between the tool bits by the housing and tool bits, said camming head portion being engageable with the tool bits forwardly for urging the tool bits outwardly and engageable with the tool bits rearwardly for urging forward ends of the tool bits inwardly of the housing in back to back contact, the camming head portion and throat portion of the mandrel being in sliding contact with the housing.

5. In a tube cutting device, the combination with a mandrel of a substantially longitudinally extending cylindrical housing which is split longitudinally into cylindrical portions and tool bit means carried by each portion which tool bit means together with the housing confine a portion of the mandrel for limited longitudinal sliding movement between the ends of the tool bit means, the housing having longitudinally extending slot means in the periphery thereof and also having pivot members integral with each said housing portion, the tool bit means extending on either side of the mandrel portion, being pivotally mounted between their ends on said members, and engageable by the mandrel portion for pivotal movement inwardly and outwardly of the housing, the housing having the longitudinally extending slot means thereof substantially completely closed by the tool bit means in the outward position of the tool bit means.

References Cited in the file of this patent

UNITED STATES PATENTS

| | | |
|---|---|---|
| 220,996 | Singer | Oct. 28, 1879 |
| 318,927 | Rothlisberger | May 26, 1885 |
| 482,496 | Coppage | Sept. 13, 1892 |
| 643,961 | Hanten et al. | Feb. 20, 1900 |
| 778,293 | Wiedeke | Dec. 27, 1904 |
| 934,351 | Pope et al. | Sept. 14, 1909 |
| 956,805 | Heller et al. | May 3, 1910 |
| 1,643,572 | Black | Sept. 27, 1927 |
| 1,851,269 | Andrade | Mar. 29, 1932 |
| 2,108,330 | Ellis | Feb. 15, 1938 |
| 2,202,986 | Ellis | June 4, 1940 |
| 2,203,011 | Ellis et al. | June 4, 1940 |
| 2,534,858 | Ellis | Dec. 19, 1950 |
| 2,690,217 | Robishaw | Sept. 28, 1954 |